May 25, 1937.　　　M. G. CROSBY　　　2,081,577
PHASE MODULATION
Filed Jan. 23, 1932　　　3 Sheets-Sheet 1
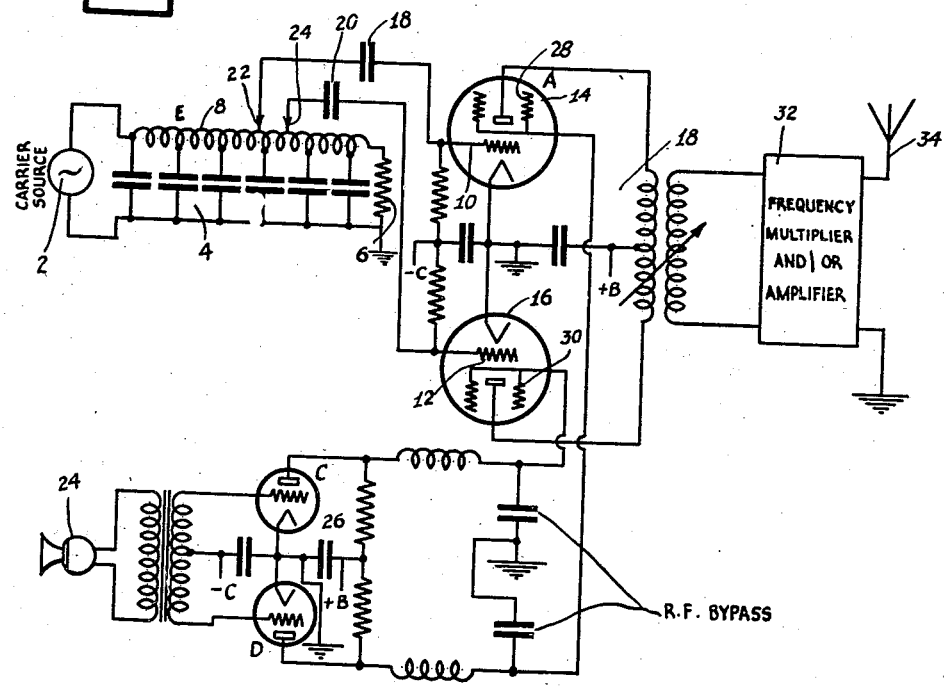
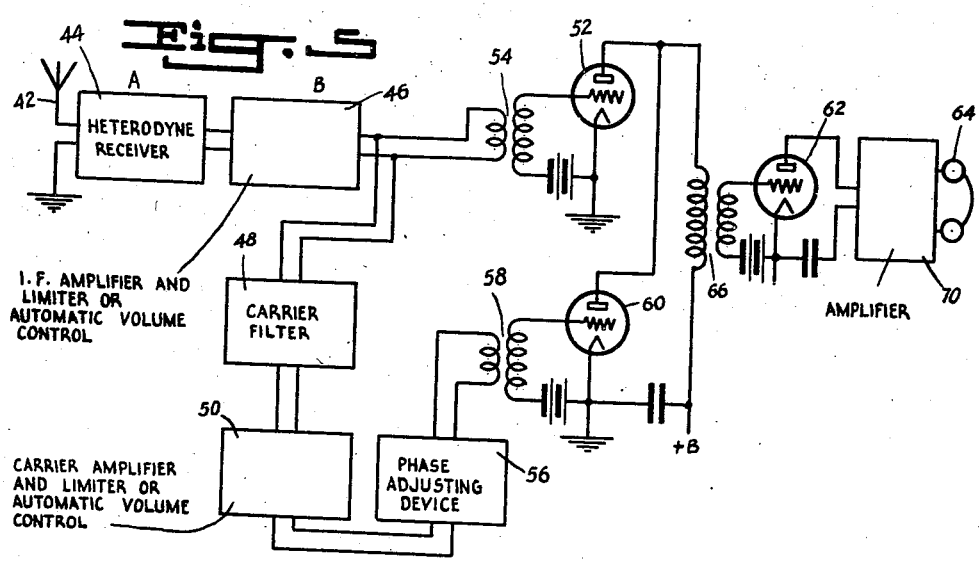
INVENTOR
MURRAY G. CROSBY
BY
ATTORNEY May 25, 1937.  M. G. CROSBY  2,081,577
PHASE MODULATION
Filed Jan. 23, 1932  3 Sheets-Sheet 2
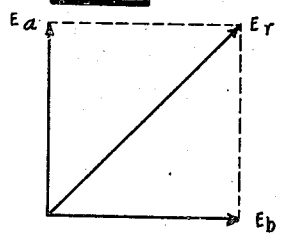
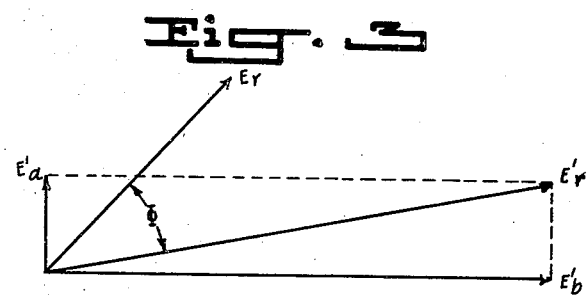
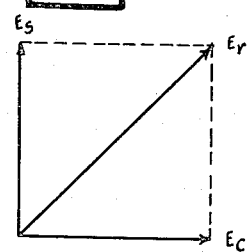
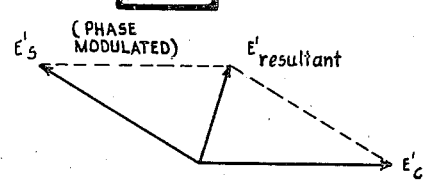
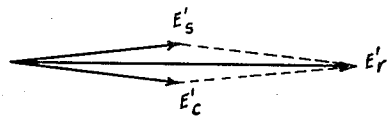
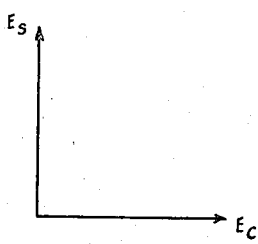
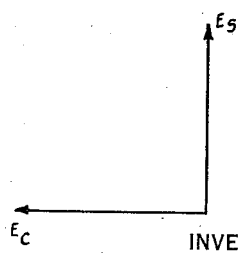
INVENTOR
MURRAY G. CROSBY
BY
ATTORNEY May 25, 1937.                M. G. CROSBY                2,081,577
                              PHASE MODULATION
                Filed Jan. 23, 1932            3 Sheets-Sheet 3
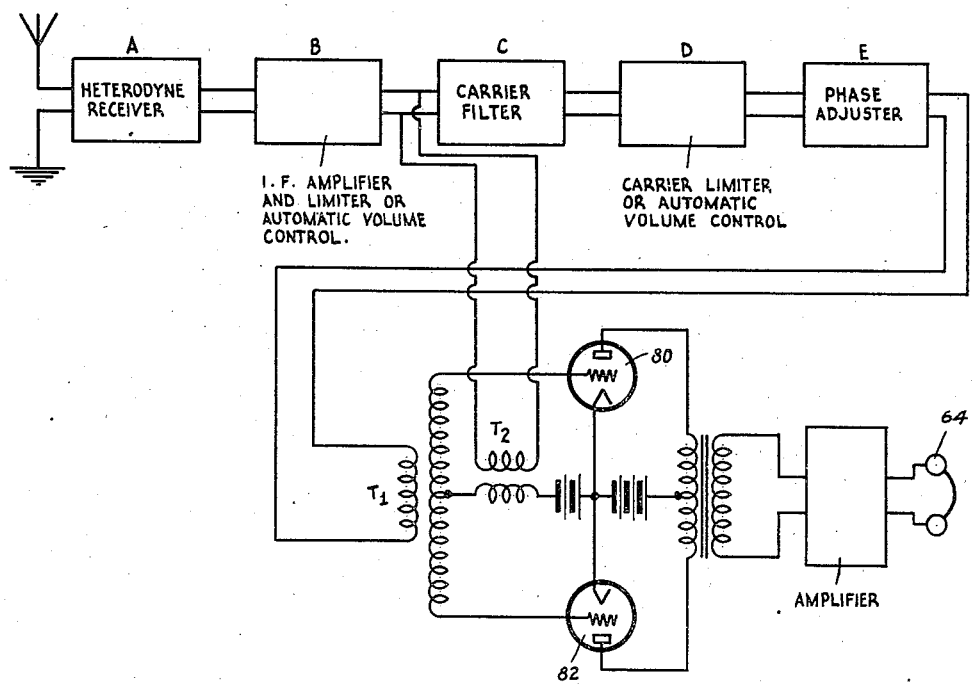
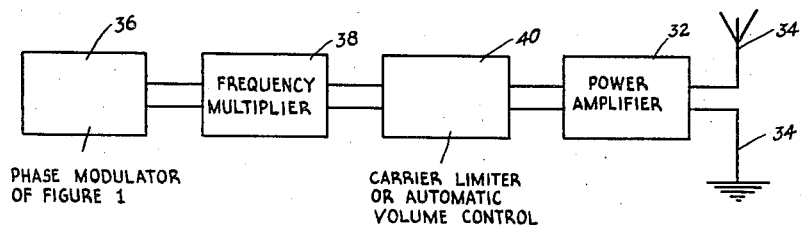
INVENTOR
MURRAY G. CROSBY
BY
ATTORNEY Patented May 25, 1937

2,081,577

UNITED STATES PATENT OFFICE 2,081,577

PHASE MODULATION

Murray G. Crosby, Riverhead, N. Y., assignor to Radio Corporation of America, a corporation of Delaware Application January 23, 1932, Serial No. 588,309

13 Claims. (Cl. 250—17)

This invention relates to the signalling art and pertains especially to the transmission of intelligence from one geographically separated point to another by the use of phase modulated waves or carrier energy.

An object of my present invention is to provide a new and useful system for producing a phase modulated wave of substantially constant frequency and, briefly, to do so I provide an arrangement and a method wherein two voltages of substantially like frequency are combined less than 180 degrees or any multiple of 180 degrees out of phase to produce a resultant voltage. According to my invention, further, the relative phase of the resultant voltage is varied by varying the relative values of the voltages combined with the predetermined number of degrees out of phase.

As such procedure may introduce a certain amount of amplitude modulation in the resultant phase modulated wave, which of course is undesirable, it is a further object of my invention to eliminate the amplitude modulation component. To do so the resultant phase modulated energy is limited by, for example, electron discharge devices operated at their saturation point, to substantially constant value.

More specifically, according to my present invention, I carry out the foregoing objects by applying to a pair of electron discharge devices voltages of like frequency a predetermined number of degrees out of phase such that the phase difference is not 0°, 180° or any whole multiple of 180° although phase differences varying slightly from 0°, 180° etc., are suitable. The outputs of the devices are so combined that there is a resultant voltage of like frequency. To vary the phase of this resultant voltage, or, in other words, the phase of the resultant carrier energy, I vary oppositely the internal impedances of the electron discharge devices. Preferably, I apply modulating voltages to screen grids of the devices and carrier voltages 90 degrees out of phase to other electrodes of the devices as will be explained more fully hereinafter.

As described, a maximum shift of less than 180 degrees is possible with the foregoing arrangement. To augment still further the phase shift produced by the modulating energy is a further object of my present invention. To do so, according to my invention, the phase shifted energy is frequency multiplied as a result of which the frequency multiplied output has a phase shift multiplied by the order of the harmonic, or order of frequency multiplication.

Another general object of my present invention is to provide improved reception methods and means for phase modulated waves.

A further object of my invention is to provide a receiving system wherein the collected phase modulated energy is combined in predetermined phase relationship with energy of substantially constant frequency and phase and wherein the combined energies are then detected and translated. It is desirable, of course, to have the energy combined with the received energy in exact synchronism with the received carrier energy. To provide for such energy, I separate the carrier energy from the received energy and combine it in proper phase as will be explained more fully hereinafter with all of the received energy whereby the combined energy is in a form which may be detected to give the transmitted signal.

It is a further object of my invention to utilize heterodyning at my receiver for phase modulated waves, using preferably a local heterodyne oscillator of adjustable frequency, as for example, using a crystal controlled oscillator with replaceable crystals of different fundamental frequencies.

By heterodyning to the intermediate frequency it is possible to have all of the intermediate frequency amplification and the final detector circuits tuned to a fixed frequency so that only the tuning of the circuits ahead of the first detector and the frequency of the first beating oscillator requires adjustment for tuning in signals. This greatly facilitates the tuning operations and makes it possible to apply complicated filter or crystal circuits in the final stages of the receiver which could not be employed if it was necessary to make their frequency variable.

The use of the heterodyne principle also makes it possible to obtain energy from the final detector circuits which varies when the transmitter frequency or receiver oscillator vary, which energy can be utilized to control the frequency of the first beating oscillator in a manner to keep the receiver automatically tuned in to the desired signal.

Moreover, for short wave reception the frequency band of the high frequency stages is much greater than the band of frequencies occupied by the signal with its sidebands. This excessively wide frequency band allows noise to enter the receiver. By beating or heterodyning down to an intermediate frequency and there applying additional frequency selectivity it is possible to limit the frequency band of the receiver to the band occupied by the signal. This results in minimum noise and interference.

Further, in connection with heterodyning it may be noted that the first heterodyne detector in a superheterodyne receiver serves the function of subtracting from all of the incoming frequencies, a frequency equal to that of the first beating oscillator. If an incoming signal of, say 10,000,000 cycles is modulated at the rate of 1,000 cycles with either phase or amplitude modulation, there will be produced sidebands 1,000 cycles above and 1,000 cycles below the carrier. In this case these sidebands have a spacing from the carrier of only 0.01%, which is much too small to permit ordinary circuits to discriminate between carrier and sidebands in the manner required for detection of phase modulation. If the signal with the 10,000,000 cycle carrier is beat with a first oscillator having a frequency of, say, 9,900,000 cycles, I obtain an intermediate frequency of 100,000 cycles, which contains the sidebands still spaced 1,000 cycles from the carrier or an amount now equal to 1%. This separation is sufficiently great so that two band pass filters may be utilized to separate the sidebands from one another in the manner described in Patent No. 1,999,902 to C. W. Hansell, and my copending application Serial No. 565,005, filed September 25, 1931, and it is also sufficient to allow the carrier to be taken out through, for example, a crystal filter, separately amplified and reintroduced with adjusted phase as described more fully hereinafter.

It may seem that, since at the transmitter, increasing the frequency increases the phase shift, at the receiver decreasing the frequency by heterodyning should decrease the shift. However, this is not so since there are two different processes involved. At the transmitter the frequency is raised by frequency multiplying and at the receiver it is lowered by heterodyning. When a wave is frequency multiplied it is passed into a harmonic generator and a harmonic is chosen for the multiplied output. Thus, only integral values of multiplication may be obtained corresponding to the 2nd, 3rd, 4th, etc., harmonics. When this sort of multiplying is applied to a wave the phase or frequency shift of phase or frequency modulation is multiplied by the order of multiplication; that is, 2, 3, 4, etc. Thus, a 10,000 cycle wave frequency modulated by a 1,000 cycle shift has a 3,000 cycle shift when it is multiplied to 30,000 cycles. The same amount of multiplication is obtained in phase modulation.

As required by law, my present invention is defined with particularity in the appended claims. However, it may best be explained both as to its structural organization and mode of operation by referring to the accompanying drawings wherein:

Fig. 1 is a wiring diagram of a phase modulation transmitting system, according to my present invention.

Figs. 2 and 3 are vector diagrams given in order to explain the operation of the system shown in Fig. 1.

Fig. 4 is a block diagram of a phase modulating system wherein the phase of a transmitted carrier may be shifted to an angle greater than 90 degrees.

Fig. 5 illustrates one form of receiver, built in accordance with the principles of my present invention, for receiving and translating propagated phase modulated wave.

Figs. 6, 7, and 7A are vector diagrams explanatory of the operation of the receiving arrangement shown in Fig. 5, Fig. 8 is a modified form of phase modulation receiver according to my present invention, Figs. 9 and 10 are vector diagrams explanatory of the operation of the receiver arrangement of Fig. 8.

Turning to Fig. 1, illustrating a transmitter for transmitting phase modulated energy, carrier energy or potentials from an oscillation generator 2 is fed to an artificial transmission line 4, terminated by a resistance that is equal in value to the surge impedance or resistance of the line 4. The generator 2 may be a crystal controlled oscillator, or any other form of substantially constant frequency oscillation generator. By virtue of the termination of the loaded line 4, at the desired carrier frequency, only travelling waves appear in the inductive portion 8 of line 4.

The control electrodes or grids 10, 12 of electron discharge devices 14, 16 are tapped through blocking condensers 18, 20 to points 22, 24 at inductance coil 8 which are less than 180° apart, for example, 90°. Accordingly, voltages of the same or like carrier frequency from source 2 are fed to tubes 14, 16, 90 degrees apart.

The vectorial relationship of the voltages so fed is illustrated in Fig. 2 for the particular case of 90 degrees separation where $E_a$ illustrates the voltage applied to tube 14 and $E_b$ indicates the alternating voltage applied to tube 16. Consequently, in the output circuit 18 of tubes 14, 16 there appears voltage $E_r$ as shown in Fig. 2. This is a resultant voltage which is of like frequency to the voltage applied from source 2.

Carrier source 2, of course, for the purpose of obtaining voltages a desired number of degrees apart to be applied to the two electron discharge devices 14, 16 may take the form of two alternators mechanically tied together so that they can generate voltages 90, or any other desired number of degrees apart in which case the output of each alternator would be fed across the grid and cathode of one of the tubes. Or, the transmission line for obtaining voltages of predetermined phase displacement may be replaced by a network of resistances, inductances and capacities to which energy of constant frequency is fed, each tube being coupled to portions of the network which have voltages generated thereacross the desired number of degrees out of phase.

By oppositely varying the output of each of the two electron discharge devices 14, 16 the resultant may be made to receive any phase as shown in Fig. 3 from $E_r$ to $E_r'$ as indicated. This shift in phase is accomplished by relatively decreasing the amplified voltage $E_a$ appearing in the output circuit due to the amplifier action of tube 14 and relatively increasing amplified voltage $E_b$ from tube 16 appearing in the output circuit and vice versa.

In order to cause this opposite variation in voltage in tubes 14, 16, modulation energy from a suitable source 24 and amplified by push pull amplifier 26 is fed as indicated in opposite phase to the screen grids 28, 30 of tubes 14, 16. Consequently, the internal impedance of the two tubes are varied oppositely and, as a result, their outputs are varied inversely to their internal impedances, thereby causing a phase shift of the resultant energy appearing in the output circuit 18 of the tubes. The phase modulated energy so appearing in the output circuit 18 of electron discharge devices 14, 16 may then be amplified by a suitable amplifier 32 and radiated or propagated through space in the form of electromagnetic wave energy by means of a suitable antenna 34.

As will be evident from an inspection of Fig. 3, the greatest amount of phase shift possible with the scheme so far described is a value less than 180 degrees or, with 90 degrees phase displaced voltages, 90 degrees; and it is also evident that this arrangement introduces a small amount of amplitude modulation. To eliminate the amplitude modulation the power amplifier 32 should be operated at all times to its saturation point. To increase or augment the relative amount of phase modulation, the apparatus 32 should include also some form of frequency multiplier.

Such an arrangement is shown diagrammatically in Fig. 4 wherein rectangle 36 indicates all of the apparatus of Fig. 1 with the exception of power amplifier 32 and antenna 34. The output of the phase modulator may be fed to a harmonic generator or frequency increaser 38, which, by multiplication in frequency of the output of apparatus 31 will cause an increased phase shift in the multiplied frequency energy corresponding to the order of its harmonic, or order of frequency multiplication.

To eliminate amplitude modulation introduced by either the phase modulation or the frequency multiplication, the frequency multiplier is followed by a limiter 40 whose output, in turn, is fed to power amplifier 32. If desired, the limiters may be placed ahead of the frequency multiplier, or, limiters may be used both ahead of and behind the frequency multiplier.

Fig. 5 illustrates a system for receiving, detecting and translating electromagnetic waves propagated by a transmitter such as described in Figs. 1 and 4. Propagated energy is collected upon a suitable collecting antenna 42 and beat to a suitable band of intermediate frequencies by the action of heterodyning apparatus 44 of known construction including a variable frequency heterodyning oscillator variable so that signals over a wide range of frequencies may be received. The intermediate frequency energy so derived is amplified to a constant value by the action of intermediate frequency amplifier and limiter 46. A portion of the energy of the intermediate frequency band is fed to filter 48 which filters out energy only of the carrier frequency and is fed to a carrier amplifier and limiter 50.

The remaining portion of the intermediate frequency energy is fed to electron discharge devices 52 through the action of transformer 54. The limited carrier frequency energy, however, is fed through a phase adjusting device 56 and transformer 58 to the input side of the electron discharge device 60 whose anode is connected as shown in parallel with electron discharge device 52. The phase adjusting device 56 is so adjusted that the potentials fed to tube 60 are substantially 90 degrees out of phase to the potentials fed to tube 52 as indicated in Fig. 6 wherein $E_s$ illustrates vectorially a potential fed to tube 52 and $E_c$ indicates the potential fed to tube 60.

Now, with the reception of a non-modulated wave, the output of detector 62 will be substantially constant as a result of which no sound will be heard in the transmitting device or phones 64. However, as a phase modulated wave is received, a resultant amplitude modulated current will be present in the primary of transformer 66. Consequently, detector 62 will, through the intermediary of low frequency amplifier 70 produce sound in the transmitting device or ear phones 64. An instantaneous vectorial diagram during the reception of phase modulated signals for the arrangement shown in Fig. 5 is given in Figs. 7 and 7A, the resultant electromotive force $E_r'$ fed to the control electrode of detector 62, varying, of course, with the phase shift of the phase modulated wave $E'$. Of course, the same result may be obtained by feeding energy from a synchronously run local oscillator to the secondary of transformer 54 or the primary of 58 rather than use the carrier apparatus 48, 50, 56, 58, 60. However, the arrangement shown is preferable in view of the known difficulties of synchronously operating a local oscillator.

Moreover, it is to be clear that heterodyning though desirable and preferable in a phase modulation receiver, is not essential. In the event that heterodyning is not used at the receiving end, amplifiers 44, 46 take the form of radio frequency amplifiers and the carrier filter 48 rather than passing the mean frequency of an intermediate band of frequencies passes the mean frequency of the received radio frequency band.

Another desirable form of receiving apparatus is shown in Fig. 8. As indicated, intermediate frequency energy is fed to the control electrodes of detector tube 80, 82 cophasally, as shown by the vectors $E_s$ in Figures 9 and 10 while filtered carrier energy is fed to the control electrodes or grids of the detectors 80, 82, 180 degrees out of phase, as shown by the vectors $E_c$ of Figures 9 and 10. Amplitude variations characteristic of the phase variations and of the signal modulations will be produced in the anode circuit energy.

Having thus described my invention, what I claim is:

1. In apparatus for producing phase modulated energy, a pair of thermionic discharge devices, each having anode, cathode and control grid electrodes, a circuit for applying energy of carrier wave frequency to the control grid of one of said devices, means for applying carrier wave energy of like frequency but of unlike phase from said circuit to the control grid of the other of said devices, a circuit connected between the anodes and cathodes of said discharge devices for combining the outputs of said devices to obtain resultant energy of like frequency, and a device applying modulating potentials in phase opposition to the internal impedances of said discharge devices, whereby the phase of the resultant energy is shifted in accordance with the modulating potentials.

2. A system as recited in claim 1 in which a load circuit is coupled to said circuit connected between the anodes of said discharge devices by way of an amplitude limiting device.

3. Apparatus as claimed in claim 1 in which a circuit for multiplying the frequency of the waves in the output of said discharge devices is coupled to the circuit between the anodes and cathodes of said devices on the one hand and to a work circuit on the other hand.

4. A device as recited in claim 1 in which an amplitude limiting circuit is coupled to the circuit connected between the anodes and cathodes of said thermionic discharge devices, and in which a frequency multiplying circuit is coupled to said amplitude limiting circuit.

5. A signalling device comprising, a source of oscillations of carrier wave frequency, a pair of thermionic tubes each having a plurality of electrodes, a transmission line having its input terminal connected to said source of oscillations, circuits connecting points on said line, at which the radio frequency potential of the wave therein from said source are of different phase, to a control electrode in each of said tubes, a load circuit coupled with the output electrodes of said tubes, and thermionic means for applying modulating potentials in phase opposition to like electrodes in said tubes.

6. A signalling device comprising, a source of wave energy of carrier wave frequency, a pair of thermionic tubes each having a plurality of electrodes, a transmission line having its input terminal connected to said source, said transmission line terminating in an impedance of such a value as to cause travelling waves only to appear in said line, circuits connecting points on said line at which the radio frequency waves in said line are of different phase, to a control electrode in each of said tubes, a load circuit coupled in push-pull relation with the output electrodes of said tubes, and thermionic means for applying modulating potentials in phase opposition to another electrode in each of said tubes.

7. Signalling means comprising, a source of wave energy of carrier wave frequency, a load circuit, a pair of thermionic tubes having their anode electrodes connected together by way of an inductance coupled to said load circuit, each of said tubes including a control electrode and an auxiliary electrode, a transmission line including an inductive reactance having its input terminal connected to said source of wave energy, a connection between the control electrode of one of said tubes and a point on said line, a connection between the control electrode in the other of said tubes and a point on said line at which the phase of the wave is displaced relative to the phase of the wave at said first named point, a source of modulating potentials, and thermionic means coupling said source of modulating potentials in phase opposition to the auxiliary electrodes of said tubes.

8. Signalling means comprising, a source of wave energy of carrier wave frequency, a load circuit, a pair of thermionic tubes having their anode electrodes connected by way of an inductance coupled to said load circuit, each of said tubes including a control electrode and an auxiliary electrode, a transmission line including an inductance having its input terminal connected to said source of wave energy of carrier frequency and its output terminal connected to an impedance of a value such as to produce travelling waves only in the inductance in said line, a connection between the control electrode of one of said tubes and a point on said line, a connection between the control electrode in the other of said tubes, and a point on said line at which the phase of the wave energy in said line is displaced relative to the phase of the wave energy in said line at said first named point, a source of modulating potentials, and thermionic means coupling said source of modulating potentials in phase opposition to the auxiliary electrodes of said tubes.

9. Signalling means comprising, a source of wave energy of carrier wave frequency, a load circuit, a pair of thermionic tubes having their anode electrodes connected by way of an inductance coupled to said load circuit, each of said tubes including a control electrode and a screen grid electrode, a transmission line including an inductance having its input terminal connected to said source of wave energy and its output terminal connected to an impedance of a value such as to produce travelling waves only in the inductance in said line, a connection between the control electrode of one of said tubes and a point on said line, a connection between the control electrode in the other of said tubes and a point on said line at which the phase of the wave energy in said line is displaced relative to the phase of the wave energy in said line at said first named point, a source of modulating potentials, and thermionic means coupling said source of modulating potentials in phase opposition to the screen grid electrodes of said tubes.

10. In a system for modulating the phase of oscillatory energy of carrier wave frequency in accordance with modulating potentials, a transmission line on which oscillatory energy to be modulated may be impressed, said line comprising series inductance and parallel capacity, a pair of electron discharge devices each having a plurality of electrodes, a connection between a control electrode in one of said devices and a point on said line, a connection between a corresponding control electrode in another of said devices and a point on said line, an output circuit connected with corresponding output electrodes of said devices, a source of modulating potentials and a circuit coupling said source of modulating potentials between corresponding electrodes in said devices to thereby control the impedances of said devices in phase opposition in accordance with said modulating potentials.

11. In a system for phase modulating oscillatory energy in accordance with modulating potentials, a pair of electron discharge devices each having a plurality of electrodes, means for applying the oscillatory energy to be phase modulated in phase displaced relation on like control electrodes in each of said devices, an output circuit connecting corresponding output electrodes of said devices in push pull relation, a source of modulating potentials and a circuit coupling said source of modulating potentials between corresponding electrodes in said devices to modulate the potentials of said electrodes in phase displaced relation in accordance with said modulating potentials whereby resultant energy modulated in phase in accordance with said modulating potentials is produced in said output circuit.

12. In apparatus for producing phase modulated wave energy, a pair of electron discharge devices each having anode, cathode, and control grid electrodes, a first circuit for applying energy of carrier wave frequency to the control grid of one of said devices, a second circuit for applying carrier wave energy of like frequency to the control grid of the other of said devices, said energy applied by said second circuit to said control grid of said other of said devices being of a phase which differs from the phase of the energy applied by said first circuit to said control grid of said one of said devices by more than 0° but less than 180°, a circuit connected between the anodes and cathodes of said discharge devices for combining the outputs of said devices to obtain resultant energy of like frequency and means for applying modulating potentials in phase opposition to the internal impedances of said discharge devices, whereby the phase of the resultant energy is shifted in accordance with the modulating potentials.

13. In a system for phase modulating oscillatory energy in accordance with modulating potentials, a pair of electron discharge devices each having a plurality of electrodes including an anode electrode, a control electrode, and a screen grid electrode, means for applying the oscillatory energy to be phase modulated in phase displaced relation on the control electrodes of said devices, an output circuit connecting the anode electrodes of said devices in push-pull relation, a source of modulating potentials and a circuit coupling said source of modulating potentials between the screen grid electrodes in said device to modulate the potentials of said screen grid electrodes in phase displaced relation in accordance with said modulating potentials whereby resultant energy modulated in phase in accordance with said modulating potentials is produced in said output circuit.

MURRAY G. CROSBY.